United States Patent Office 3,695,837
Patented Oct. 3, 1972

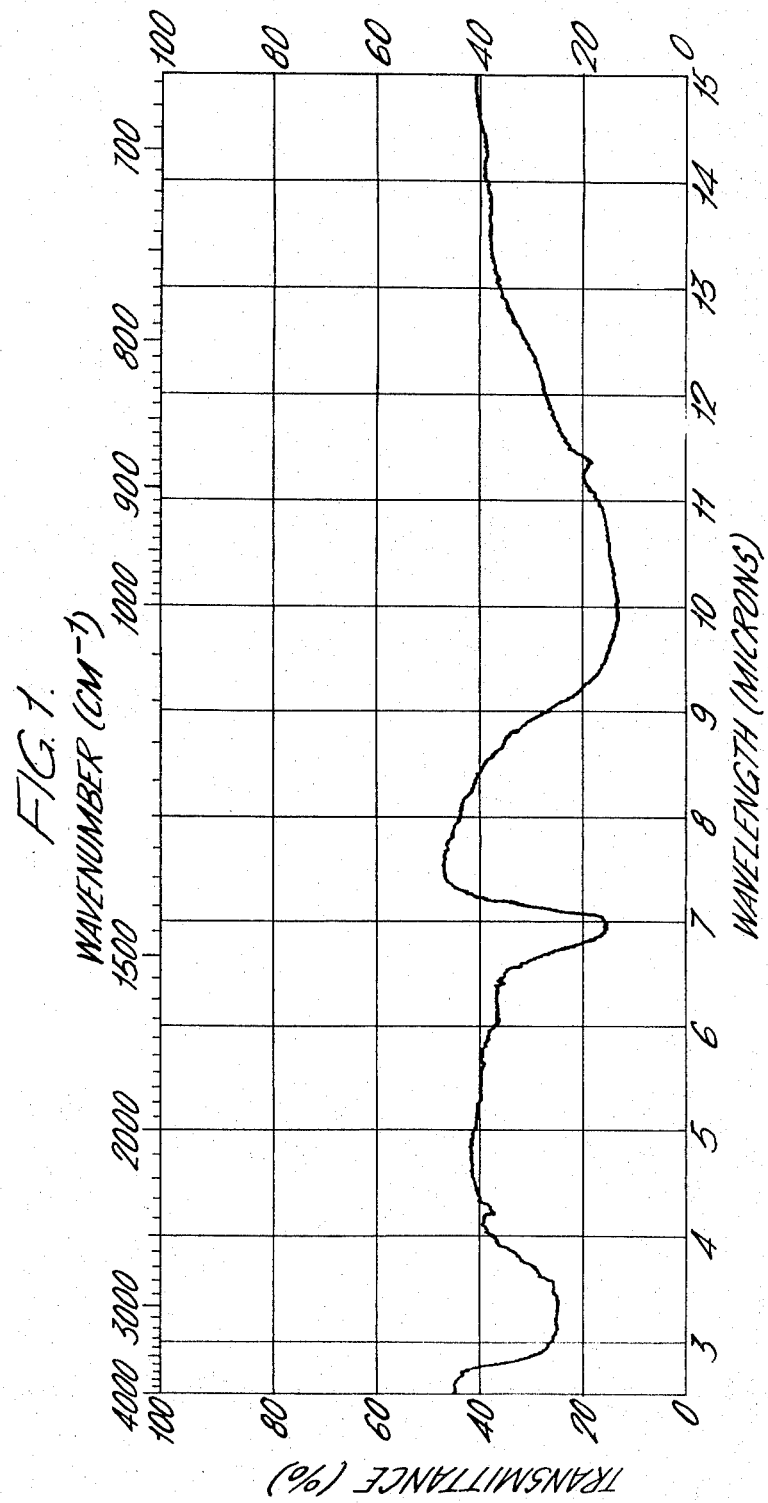

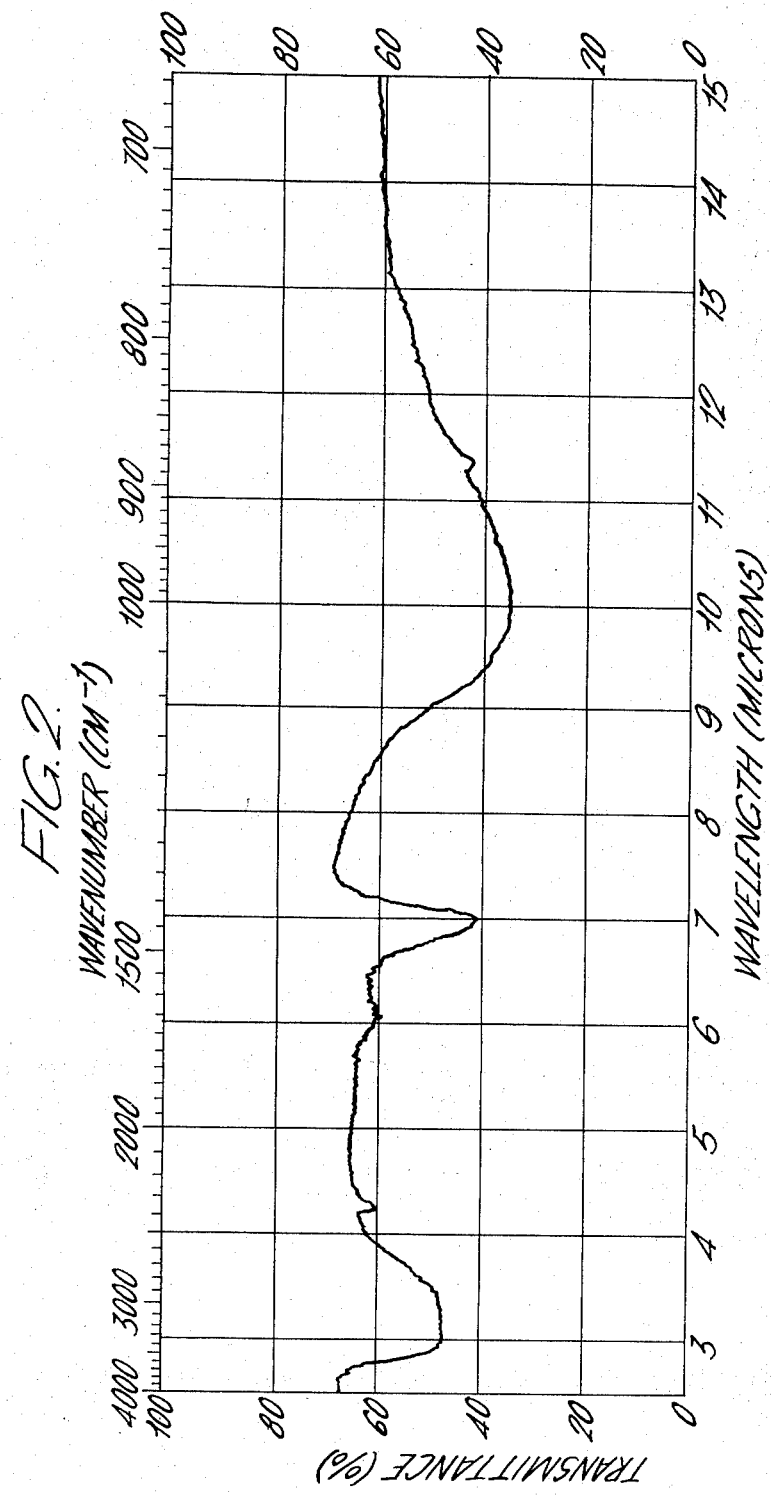

3,695,837
PREPARATION OF CRYSTALLINE SYNTHETIC ZEOLITES
Stephen Sunderland, Widnes, Lancashire, and Thomas V. Whittam, Yarm-on-Tees, Yorkshire, England, assignors to Laporte Industries Limited, London, England
Filed May 28, 1970, Ser. No. 41,428
Claims priority, application Great Britain, May 29, 1969, 27,131/69
Int. Cl. C01b 33/28
U.S. Cl. 423—328        13 Claims

ABSTRACT OF THE DISCLOSURE

Crystalline synthetic zeolites are prepared by reacting in an aqueous reaction mixture in suitable proportions a siliceous component, an alumina component, and an alkali metal component, a portion of the siliceous component being provided by a crystalline aluminosiliceous compound obtained by partially removing aluminum from the lattice of a crystalline zeolite with an acid while retaining at least some crystallinity.

BACKGROUND OF THE INVENTION

This invention relates to the preparation of crystalline synthetic zeolites. Additionally, this invention relates to aluminosiliceous compounds suitable for use in preparing crystalline synthetic zeolites, to the preparation of the aluminosiliceous compounds and to their use in a process of preparing crystalline synthetic zeolites. The invention also relates to certain novel crystalline synthetic zeolites and to a process for preparing the novel crystalline synthetic zeolites.

As is known crystalline synthetic zeolites can be prepared by crystallising the required zeolite from an aqueous reaction mixture containing, in suitable proportions, a silica component, an alumina component and an appropriate metal cation, usually sodium.

Compounds which have been used as starting materials to provide the alumina component of the reaction mixture include sodium aluminate, aluminium salts and soluble alumina, that is alumina which dissolves readily in cold acid or caustic alkali.

Compounds which have been used as starting materials to provide the silica component of the reaction mixture include commercially available materials such as water glass, colloidal silica, silicic acid and certain silicates. More recently crystalline synthetic zeolites have been prepared, in particular zeolite A and synthetic faujasites, in which specified "active" siliceous compounds are used in the production of the aluminosilicate reaction mixture. These preparations are described and claimed in British patent specification Nos. 1,082,131, 1,145,995, 1,171,463, 1,193,254 and pending application No. 27,132/69. These compounds have a unique and unexplained catalytic effect on zeolite production reactions. The synthetic faujasites are isostructural with natural faujasites and have come to be known as zeolite X and zeolite Y. The term "active" as applied to siliceous compounds is defined in the said specifications and applications and where reference is made in the present specification to "active" siliceous compounds it is used in the sense.

This use of the term "active" is to be distinguished from the conventional use of the term "activated" in conventional silica technology. In conventional silica technology a regular density silica gel (see Kirk Othmer Encyclopedia of Chemical Technology, (Interscience), 2nd edition, vol. 18 pp. 63–65), with a large internal surface area is prepared by mixing sodium silicate with a strong mineral acid to first form a silica hydrosol, the hydrosol is allowed to set to a gel and the resulting mass of hydrogel is broken up mechanically, washed and finally "activated" by thermal means. Such "activated" silica does not possess the catalytic effect referred to above.

With the sole exception of their catalytic effect on zeolite reactions no difference has been found between "active" and other siliceous compounds of the same chemical formula. Thus no difference has been found in chemical composition, nor any difference on physical examination by infra-red spectroscopy (KBr Disc), electron microscopy and thermogravimetric analysis. Even X-ray powder diffraction data have completely failed to distinguish an "active" sodium silicate hydrate or silica. It has therefore been necessary in the absence of any other difference to rely on an activity test based on their difference in behaviour in zeolite reactions in order to distinguish between "active" and other forms of a particular siliceous compound.

The advantages gained by using an "active" siliceous compound are,
(a) Greatly increased reaction rates at any given temperature
(b) Products of greater purity are obtained
(c) Long ageing stages can be omitted in Zeolite X preparation and as regards Zeolite Y no ageing stages are required as are necessary in prior preparations, for example as described in U.S. Patent No. 3,130,007 and
(d) Problems related to mechanical and thermal agitation such as are described in British Patent No. 973,933 (Zeolite X production) and U.S. Patent No. 3,130,007 (Zeolite Y production) do not exist.

It has now been found surprisingly that the above advantages together with further, previously unattained, advantages in the direction and control of the preparation of crystalline synthetic zeolites can be obtained by using a new aluminosiliceous compound as a part of the zeolite reaction mixture, and further that new crystalline synthetic zeolites can be prepared from such zeolite reaction mixtures.

According to one aspect of the present invention there is provided a process for the preparation of a crystalline synthetic zeolite which comprises the steps of
(a) Partially removing aluminium from a crystalline aluminosilicate having the formula $$xM_{2/n}O:Al_2O_3:ySiO_2:zH_2O$$

wherein M is a metal cation, an ammonium cation, or a hydrogen cation, $n$ is the valency of the cation, $x$ has a value lying in the range of from 0.7 to 1.3, $y$ has a value lying within the range of from 2 to 15 and $z$ has a value of up to 10 to produce an aluminosiliceous compound retaining at least some crystallinity,
(b) Reacting in an aqueous reaction mixture and in proportions within the reactant limits for the crystalline synthetic zeolite a siliceous component, an alumina component, and an alkali metal component, a part of the siliceous component being provided by the crystalline aluminosiliceous compound formed in step (a), and (c) Separating the solid crystalline synthetic zeolite product.

The term aluminosiliceous compound is used through the specification to mean the product obtained on partially removing aluminium from the lattice of the said crystalline aluminosilicates.

The use of the aluminosiliceous compound of this invention as stated above, gives the advantages of the "active" siliceous compounds above described in promoting zeolite production reactions. These aluminosiliceous compounds also have the property that, if present, as hereafter described, in a zeolite production reaction, they will, in general tend to direct the zeolite production reaction towards products having a ring system related to that of the zeolite from which the aluminosiliceous compound itself was derived as herein described.

Thus it has been found that an aluminosiliceous compound derived from zeolite B, which is a zeolite having a structure based on four-membered rings, and an aluminosiliceous compound derived from mordenite, which is a zeolite having a structure based on four-membered and five-membered rings, when used in a specified zeolite reaction give pure zeolite B. In comparative preparations in which the aluminosiliceous compound was omitted, but in which the same oxide molar ratios of silica, alumina and cation were employed, the product is a mixture of zeolite B, zeolite C and amorphous material.

Although it is not intended that the present invention be restricted to any particular theory, it is believed that on effecting partial removal of aluminium from the lattice of the crystalline aluminosilicate, a reactive entity, the aluminosiliceous compound, is obtained this entity having the ability of "remembering" at least in part the structure of the crystalline aluminosilicate from which it was derived. In use in the preparation of zeolites, the reactive entity acts as a nucleus from which growth of the zeolite product preferentially occurs and, provided that extremes of molar ratios of reactants are not employed, the structure of the growing zeolite follows the same basic structure as that of the crystalline aluminosilicate from which the reactive entity was derived. In this manner the reactive entity directs and promotes formation of the zeolite product. Besides this zeolites containing a combination of metal cations, e.g. sodium and potassium, can be prepared by a direct process from the aluminosilicate reaction mixtures without using ion exchange techniques to introduce a second cation.

Thus for example a zeolite Y containing both sodium and lithium cations may be directly prepared from a reaction mixture containing the required proportions of lithium and sodium cations. Further, the aluminosiliceous compounds make possible the preparation of a new zeolite, Zeolite LS 101 which it has not been possible to prepare by the use of the previously described "active" siliceous compounds using the reactant ratios hereafter specified. A further new zeolite, Zeolite LS 102, can also be prepared using the aluminosiliceous compounds of the present invention.

Partial removal of aluminium from the lattice of the specified crystalline aluminosilicate may be effected by treating the crystalline aluminosilicate with an acid, suitably in an aqueous medium. Examples of acids which may be used are mineral acids, e.g. hydrochloric acid, sulphuric acid and nitric acid and strong organic acids e.g. trichloracetic acid.

Where a metal or ammonium aluminosilicate is treated in this manner partial removal of aluminium is accompanied by ion exchange of at least part of the cation content of the aluminosilicate.

Examples of crystalline aluminosilicates from which the aluminosiliceous compound of the present invention may be obtained are zeolites. Particularly useful aluminosiliceous compounds are those obtained from the zeolites classified as three-dimensional zeolites. Examples of such zeolites include the naturally occurring zeolites chabazite, gmelinite, mordenite, analcite and faujasite, the synthetic forms of chabazite, gmelinite, mordenite, erionite and offretite and the zeolites B, X and Y. Zeolites having a fibrous structure, for example natrolite, or a laminar structure, for example heulandite, may also be used.

In effecting partial removal of the aluminium from a crystalline aluminosilicate by treating the aluminosilicate in an aqueous medium with an acid, the acid may be brought into contact in any suitable manner. Conveniently, an aqueous solution of the acid may be added to an agitated aqueous slurry of the aluminosilicate, or the aluminosilicate may be added to an agitated aqueous solution of the acid. Acid treatment conditions giving rise to complete removal of aluminium which is accompanied by complete breakdown of the aluminosilicate lattice, such as direct treatment of the aluminosilicate with concentrated acids, are to be avoided.

To obtain the advantages of this invention it is generally necessary to retain at least 1% crystallinity in the aluminosiliceous compound. Totally amorphous materials are ineffective in promoting zeolite reactions. The removal of a given amount of aluminium from different crystalline aluminosilicates will result in a different degree of breakdown of the crystal structure of the aluminosilicate depending on the $SiO_2/Al_2O_3$ molar ratio of the aluminosilicate and the lattice structure of the aluminosilicate and, possibly, other factors. The maximum amount of aluminium which may be removed must therefore be tailored to the particular crystalline aluminosilicate used, care being taken to avoid complete breakdown of the crystal lattice.

On the other hand at least some breakdown of the crystalline aluminosilicate to amorphous material must occur. The minimum degree of breakdown which will result in an aluminosiliceous compound useful in the present invention varies with the identity of the crystalline aluminosilicate. In general the higher the $SiO_2:Al_2O_3$ ratio the smaller the degree of breakdown which will result in a useful aluminosiliceous compound. The minimum degree of breakdown which will result in a useful aluminosiliceous compound must be determined in each instance by experiment. The present invention also provides a process for the production of the aluminosiliceous compounds useful in the production of zeolites comprising a process for the preparation of an aluminosiliceous material particularly useful in the preparation of synthetic zeolites comprising the steps of (a) Treating a crystalline aluminosilicate of the general formula, expressed in terms of oxides,

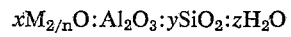

$$xM_{2/n}O:Al_2O_3:ySiO_2:zH_2O$$

wherein M is a cation selected from the group consisting of a metal, the ammonium cation and the hydrogenation, $n$ is the valency of M, $x$ has a value lying within the range of from 0.7 to 1.3, $y$ has a value lying within the range of from 2 to 15 and $z$ has a value of up to 10, with an aqueous medium consisting essentially of an aqueous solution of a mineral acid or a strong organic acid, and (b) Separating the resulting aluminosiliceous compound from the aqueous medium.

It is advantageous in preparing the aluminosiliceous compounds of the present invention by treatment of the specified crystalline aluminosilicates in an aqueous medium with acid to maintain the pH of the aqueous medium above a predetermined minimum value whereby particularly effective aluminosiliceous compounds are obtained.

The method of preparing aluminosiliceous compounds in accordance with this feature of the present invention is particularly applicable to the preparation of aluminosiliceous compounds from aluminosilicates of relatively low silica to alumina molar ratio, that is less than 5 and especially less than 3. For an aluminosilicate of silica to alumina molar ratio of less than 3, the predetermined minimum pH value is preferably pH 3 and the pH of the aqueous medium during acid treatment preferably lies within the range of from greater than 3 up to 5. For a silica to alumina molar ratio of from greater than 3 and up to 5, the predetermined minimum pH value is preferably pH 2 and the pH of the aqueous medium during acid treatment preferably lies within the range of from greater than 2 up to 4. Where the pH of the aqueous medium is allowed to fall below the above quoted minimum values, removal of aluminium may be accompanied by breakdown of the aluminosilicates lattice to the extent that wholly ineffective products are obtained. In such instances other parameters such as temperature, time of contact and concentration of acid in the aqueous medium may well become critical.

The pH of the aqueous medium may be maintained above the predetermined minimum value by buffering the aqueous medium to the required pH. Thus the aluminosilicate starting material may be added to a solution containing the acid and buffered to the required pH. Alternatively, the pH of the aqueous medium may be maintained above the minimum value in the absence of external buffering agents by mixing the acid and zeolite under conditions such that the pH of the medium does not fall below that value. For example, an aqueous solution of the acid may be added to a vigorously stirred aqueous slurry of the zeolite at a rate such that the pH of the medium does not fall below the required pH.

In the case of aluminosilicates of silica to alumina molar ratio of greater than 5, the effect of the pH of the aqueous medium upon the production of effective aluminosiliceous compound is less marked and aluminosiliceous compounds of relatively high effectiveness towards a subsequent zeolite reaction may be obtained in the absence of the above-mentioned steps for controlling the pH of the aqueous medium.

If however, the most effective aluminosiliceous compounds are required, then for a silica to alumina ratio of from greater than 5 and up to 6 the pH of the aqueous medium should not fall below pH 1, while for a silica to alumina ratio of greater than 6 and up to 9 the pH should not fall below 0 and for a silica to alumina ratio of greater than 9 the pH should not fall below $-1$. Preferred ranges within which the pH should be are as follows:

Silica to alumina ratio:                      pH range
    Greater than 5 and up to 6 _____ 1 to 4
    Greater than 6 and up to 9 _____ 0 to 4
    Greater than 9 _____ $-1$ to 3

The effectiveness of an aluminosiliceous compound in promoting a subsequent zeolite reaction has been found to be dependent, in part, upon the proportion of aluminium which is removed from the crystalline aluminosilicate starting material which, in turn, is dependent upon the acid treatment conditions employed in effecting partial removal of the aluminium. In general it may be said that starting from an aluminosilicate of high aluminium content (low silica to alumina molar ratio) the most effective aluminosiliceous compounds are obtained on removal of only a minor proportion of the aluminium from the aluminosilicate, while starting from an aluminosilicate of low aluminium content the most effective aluminosiliceous compounds are obtained on removal of a major proportion of the aluminium. For example, in the faujasite family removal of 15% of the aluminium content of a zeolite X of silica to alumina molar ratio of 2.7, and removal of 27% of the aluminium content of a zeolite Y of silica to alumina molar ratio 5.2 have been found to give very effective aluminosiliceous compounds. In the case of a gmelinite of silica to alumina molar ratio of 6.15, removal of 63% of the aluminium has been found to give an effective aluminosiliceous compound. A test procedure for ascertaining the eeffctiveness of an aluminosiliceous compound towards a particular zeolite reaction is described later in the present specification.

The effectiveness of the aluminosiliceous compound in the production of crystalline synthetic zeolites has further been found to be dependent on the quantity of acid used to treat a unit quantity of the aluminosilicate to effect partial removal of aluminium from the lattice thereof. For a crystalline aluminosilicate of the formula, expressed in terms of oxides, $$xM_{2/n}O:Al_2O_3:ySiO_2:zH_2O$$

where $x$ is one, M is a hydrogen or an acid-exchangeable cation, $n$ is the valency of M and $y$ and $z$ represent the number of moles of silica and water respectively, eight gram equivalents of acid per gram mole of the aluminosilicate are required in theory to effect complete removal of the aluminium and cation from the aluminosilicate. For a given set of conditions it has been found that, in general, the use of about half of the theoretical quantity of acid required to effect complete removal of aluminium and acid-exchangeable cation from the crystalline aluminosilicate gives the most effective aluminosiliceous compounds. The precise ratio of acid to zeolite, or range of ratios, giving the most effective aluminosiliceous compounds is dependent upon the silica to alumina molar ratio of the aluminosilicate starting material. For instance, for a zeolite Y of silica to alumina molar ratio of 5.2 the use of from 3.0 to 6.5 gram equivalents of a mineral acid per gram mole of the zeolite has been found to give aluminosiliceous compounds of relatively high effectiveness with a peak at a ratio of 4.8. For a zeolite Y of silica to alumina molar ratio of 4.5 and treated under similar conditions, comparable aluminosiliceous compounds are obtained within the narrower range of from 4.2 to 4.4 gram equivalents of acid per gram mole of the zeolite with a peak at a ratio of 4.3. In the case of a gmelinite of silica to alumina molar ratio of 6.2, a ratio of acid to zeolite of 6.0 gram equivalents of acid per gram mole of zeolite has been found to give a particularly effective aluminosiliceous compound. The acid to zeolite ratios quoted for the two zeolites Y and for gmelinite are for acid treatment conditions where the pH of the aqueous medium did not fall below pH 1.

The optimum ratio of acid to aluminosilicate for a particular combination of aluminosilicate and acid may be determined by carrying out a series of acid treatments using a range of ratios of acid to aluminosilicate and determining the effectiveness of the resulting aluminosiliceous compounds towards a particular zeolite reaction.

The concentration of the acid in the aqueous medium in terms of gram equivalents of acid per litre of aqueous medium may be within the range of from 0.05 to 3.0 and is preferably about 0.5. Conveniently, removal of the aluminium from the aluminosilicate may be effected at ambient temperature, that is at a temperature of from 10–30° C. If desired, however, for aluminosilicates of silica to alumina molar ratio of greater than 4 a temperature of up to about 80° C. may be employed. At temperatures of above 80° C., prolonged treatment of the aluminosilicate in aqueous media containing high concentrations of acid should be avoided since under these conditions complete degradation of the aluminosilicate may occur resulting in ineffective products.

The time of contact of the acid with the aluminosilicate in the aqueous medium to effect partial removal of aluminium is not considered to be critical where ambient temperatures are employed, and contact times of from a few minutes to several hours may be used. To facilitate contact between the acid and the aluminosilicate and partial removal of the aluminium from the aluminosilicate it is preferred that the aqueous medium be agitated.

The aluminosiliceous compound obtained on acid treatment of a crystalline aluminosilicate may be separated from the aqueous medium in any convenient manner, such as by filtration, purified by washing with water to remove entrained salts and finally dried at a temperature of up to about 100° C.

Where difficulty is experienced in separating the aluminosiliceous compound from the aqueous medium by filtration, silica may be used as a filtration aid. Such difficulty is likely to be experienced in the case of aluminosilicate starting materials of silica to alumina molar ratio of less than about 4 where the pH of the aqueous medium during acid treatment falls below the previously stated minimum value and the other reaction parameters are not strictly controlled. A suitable silica is precipitated silica in particulate form. The precipitated silica may be mixed with the aluminosilicate starting material and the resulting mixture then subjected to acid treatment to give the corresponding aluminosiliceous compound. Alternatively, a soluble silicate may be added to the aqueous medium containing the aluminosilicate starting material and precipitation of the silica content of the silicate effected in any suitable manner. On a silica basis, the molar ratio of aluminosilicate to precipated silica is preferably about 1. Where the silica filtration aid is employed, the mixture of aluminosiliceous compound and silica separated from the aqueous medium may be used directly in the preparation of zeolites.

The relative effectiveness of an aluminosiliceous compound in promoting a particular zeolite reaction may be determined by subjecting the aluminosiliceous compound to a test procedure designed to yield that particular zeolite, separating the product obtained and then determining the quantity of the particular zeolite in the product. In this manner, the optimum condition for obtaining the most effective aluminosiliceous compound from a given zeolite starting material, by for example variations in the acid treatment conditions of that zeolite, may be established.

Thus, in the case of aluminosiliceous compounds obtained from members of the faujasite family we have devised a test procedure designed to yield substantially pure zeolite X. The percentage of zeolite X obtained in the product, in addition to giving a measure of the effectiveness of the particular aluminosiliceous compound towards zeolite X production, also gives a measure of the effectiveness of that aluminosiliceous compound towards the production of other members of the faujasite family.

In the test procedure a reaction mixture is prepared in which the proportions of the reaction components, expressed in terms of oxide molar ratios, are:

$SiO_2/Al_2O_3$ ---------------------------------- 3.85
$Na_2O/SiO_2$ ----------------------------------- 1.34
$H_2O/Na_2O$ ------------------------------------ 47.00

In this reaction mixture 1 molar percent, on a silica basis, of the silica component is provided by the aluminosiliceous compound under test while the remainder is provided by sodium disilicate. We have used a commercially available sodium disilicate liquor of composition

$Na_2O:2.0SiO_2:14.1H_2O$

The source of alumina, other than the aluminosiliceous compound, is sodium aluminate and here we have employed a sodium aluminate liquor of composition

$1.3Na_2O:Al_2O_3:12H_2O$

Any additional $Na_2O$ component which is required is provided by sodium hydroxide.

In carrying out the test procedure the required amount of sodium hydroxide is dissolved in about two thirds of the total amount of water required. The required amount of sodium disilicate is then added to the solution and thoroughly dispersed, followed by the required amount of aluminosiliceous compound. The resulting mixture is stirred vigorously for 10 minutes and a solution containing the required amount of sodium aluminate and the remainder of the water is slowly added under vigorous stirring which is maintained for a further 10 minutes. During the foregoing operations the temperature is kept at below 40° C. The reaction mixture so produced is heated to a temperature of from 90–95° C. and then maintained at this temperature under reflux for a period of three hours, the reaction mixture being vigorously stirred throughout. The product is filtered from the mixture, washed to a pH of about 10.5 and then dried at a temperature of 80–140° C. The X-ray diffraction pattern of the product is then determined and by comparison of the pattern with a series of standard patterns the weight percentage of zeolite X in the product is calculated. A suitable scale for carrying out this test procedure is that giving 100–600 g. of the reaction mixture.

By a suitable selection of the molar ratios of reactants in the reaction mixture, test procedures may be similarly devised for assessing the effectiveness of a particular aluminosiliceous compound towards the preparation of other zeolites.

Crystalline synthetic zeolites which may be prepared from the aluminosiliceous compounds by the process of the invention are those having a general formula, expressed in terms of oxides, of

$$1.0 \pm 0.3 M_{2/n}O:Al_2O_3:XSiO_2:YH_2O$$

wherein M is a metal, ammonium or hydrogen cation, or combination of these cations, $n$ is the effective valency of M, X has a value of from 2 up to 15, especially from 2 up to 7 and Y has a value of up to about 10. Usually, the metal cation will be an alkali metal cation, in particular a sodium cation. Other metal zeolites may be prepared from the alkali metal zeolites using known ion-exchange techniques. The process of the invention is also particularly applicable to the preparation of zeolites containing a combination of metal cations such as sodium and potassium cations.

A wide range of crystalline synthetic zeolites may be prepared including zeolites A, B, X, Y, D, L, R, S, T, mordenite and the novel zeolites, hereinafter described and characterised, designated as zeolite LS 101 and zeolite LS 102.

As previously stated, it is an essential requirement of the process of the present invention for preparing crystalline synthetic zeolites, that at least part of the silica component of the reaction mixture is provided by an aluminosiliceous compound. As also previously stated the aluminosiliceous compounds have the ability to direct a zeolite reaction.

Similarly an aluminosiliceous compound derived from zeolite Y, a zeolite having a structure based on six-membered and four-membered rings, gives rise to zeolite products having a structure based on six-membered and four-membered rings, or a structure based on six-membered rings alone. The precise nature of the zeolite product is also dependent upon the oxide molar ratios of the components of the reaction mixture. In the absence of the aluminosiliceous compounds, but using the same oxide molar ratios of silica, alumina and cation in the reaction mixture either the desired zeolite is not obtainable or, if obtainable, such as in the case of zeolite X, requires unduly long reaction periods.

In general, it may be said that the aluminosiliceous compound will give rise to zeolite products having a ring system which is related to that of the zeolite from which the aluminosiliceous compound was derived.

In preparing a particular zeolite in accordance with the present invention, the aluminosiliceous compound preferably provides, on a silica basis, from 0.5 to 15 molar percent of the silica component of the reaction mixture. Percentages above the upper limit may be employed but are less desirable on economic grounds. If desired, percentages somewhat below the lower limit may be used but at the expense of longer reaction times. It will be apparent that in addition to providing part of the silica component the aluminosiliceous component also provides part of the alumina component of the reaction mixture.

The balance of the silica component of the reaction may be provided by any suitable siliceous compound examples of which are water glass, colloidal silica, silicic acid and silicates.

The balance of the alumina component of the reaction mixture is preferably provided by a soluble aluminate, for example where a sodium zeolite is required by sodium aluminate. Other sources of alumina such as aluminium salts of soluble alumina may also be employed. The balance of the required cation is suitably provided in the form of the corresponding metal hydroxide.

The relative proportions in the reaction mixture of the silica component, alumina component, cation and water are chosen in accordance with the zeolites A, X and Y using an aluminosiliceous compound derived from a zeolite of related structure such as zeolite Y itself, the proportions of the components in the reaction mixture, expressed in terms of oxide molar ratios, should lie within the following ranges:

|  | Broad range | Preferred range |
|---|---|---|
| Zeolite A: |  |  |
| $SiO_2/Al_2O_3$ | 0.60 to 4.0 | 0.19 to 2.7. |
| $Na_2O/SiO_2$ | 0.7 to 20.0 | 0.85 to 9.7. |
| $H_2O/Na_2O$ | 15 to 200 | 30 to 200. |
| Zeolite X: |  |  |
| $SiO_2/Al_2O_3$ | 2 to 30.0 | 2.8 to 8.0. |
| $Na_2O/SiO_2$ | 0.4 to 6.5 | 0.7 to 5.0. |
| $H_2O/Na_2O$ | 10 to 150 | 35 to 120. |
| Zeolite Y:[1] |  |  |
| $SiO_2/Al_2O_3$ | 8.0 to 30.0 | 8.0 to 20.0. |
| $Na_2O/SiO_2$ | 1.0 to 3.0 | 1.0 to 3.0. |
| $H_2O/Na_2O$ | 10 to 120 | 35 to 90. |

[1] Of $SiO_2/Al_2O_3$ molar ratio up to 4.

Within the above ranges of oxide molar ratios, certain combinations of ratios, in particular combinations selected from the extremes of the quoted ranges, will give zeolite A, X or Y in admixture with significant quantities of crystalline or amorphous impurities. Further since zeolite X and zeolite Y are isostructural and the division between these zeolites is an arbitrary division, certain combinations of oxide molar ratios will give zeolite Y and the X range and zeolite X and the Y range. Thus in the X range a low $Na_2O/SiO_2$ molar ratio and also a high $SiO_2/Al_2O_3$ molar ratio favours formation of zeolite Y.

In preparing a zeolite Y of $SiO_2/Al_2O_3$ molar ratio of greater than 4, the following ranges of oxide molar ratios are considered to be suitable for preparing such a zeolite Y:

(1) Zeolite Y of $SiO_2/Al_2O_3$ molar ratio of greater than 4 and up to 5.

$SiO_2/Al_2O_3$ ---------------------------------- 10–50
$Na_2O/SiO_2$ ---------------------------------- 0.5–1.0
$H_2O/Na_2O$ ---------------------------------- 12–120

(2) Zeolite Y of $SiO_2/Al_2O_3$ molar ratio of greater than 5.

$SiO_2/Al_2O_3$ ---------------------------------- 20–50
$Na_2O/SiO_2$ ---------------------------------- 0.4–0.5
$H_2O/Na_2O$ ---------------------------------- 12–120

It has further been found that an aluminosiliceous compound derived from a zeolite having a structure based on four-membered and six-membered rings may be used to prepare zeolites based on six-membered rings alone. Thus using an aluminosiliceous compound derived from zeolite Y, synthetic gmelinite—a hexagonal zeolite—may be obtained. In preparing synthetic gmelinite in this manner, the oxide molar ratios of the components of the reaction mixture should be as follows:

$SiO_2/Al_2O_3$ ---------------------------------- 8–20
$Na_2O/SiO_2$ ---------------------------------- 0.15–0.5
$H_2O/Na_2O$ ---------------------------------- 12–120

In preparing zeolite B using an aluminosiliceous compound derived from zeolite B itself or mordenite—the starting materials being respectively based on four-membered rings, and on four-membered and five-membered rings—the following oxide molar ratios of the reaction components should be employed.

|  | Broad range | Preferred range |
|---|---|---|
| $SiO_2/Al_2O_3$ | 2 to 30 | 2.8 to 8.0. |
| $Na_2O/SiO_2$ | 0.4 to 6.5 | 0.7 to 5.0. |
| $H_2O/Na_2O$ | 10 to 150 | 35 to 120. |

The combinations of the oxide molar ratios within a major part of the above quoted ranges will give substantially pure zeolite B, but with certain combinations of oxide molar ratios, in particular where combinations from the extremes of the quoted ranges are employed, the product may be contaminated with significant amounts of other crystalline or amorphous products.

From the reaction mixture containing the required proportions of the reaction components, crystallisation of the zeolite product occurs within a period of time which is dependent upon the oxide molar ratios of the reaction components, the relative effectiveness of the aluminosiliceous product, whether or not the reaction mixture is agitated, and upon the temperature of the reaction mixture. In general, the temperature of the reaction mixture may be within the range of from 20–120° C. and advantageously within the range of from 80–120° C. Although crystallisation may be effected from a non-agitated reaction mixture, crystallisation generally occurs within a shorter period of time with an agitated reaction mixture and for this reason agitation is preferred.

It has been found that by the process of the present invention for preparing zeolites, two novel zeolites containing sodium and potassium taken singly or in combination may be prepared directly from a reaction mixture containing sodium and/or potassium cations and specified proportions of the other reaction components. The novel zeolites are hereinafter designated zeolite LS 101 and zeolite LS 102.

The formula for the novel crystalline zeolite LS 101, expressed in terms of oxides, is as follows:

$$0.7-1.3(aNa_2O:(1-a)K_2O):Al_2O_3:bSiO_2:cH_2O$$

wherein $a$ is from 0 to 1, $b$ is from 2 up to 6.5 and $c$ is any value up to about 7.

Zeolite LS 101 is characterised by its composition and X-ray powder diffraction pattern. The X-ray powder diffraction data for a typical example of LS 101 are shown in Table VII. The data were obtained using a Guinier camera and copper K-alpha radiation. Standard techniques were employed. It will be appreciated that, as with other zeolites, the X-ray data for a particular example of zeolite LS 101 may, due to differences in operating conditions or other factors, show some difference in the intensity or position of some of the lines as compared with the data set forth in Table VII.

Zeolite LS 101 finds use as an absorbent and may also be used as a hydrocarbon cracking catalyst.

The novel zeolite LS 101 may be prepared using an aluminosiliceous compound derived from zeolites based on six-membered rings related to chabazite such as chabazite itself, gmelinite and zeolites D, K=G, R and S. As a typical example there may be mentioned an aluminosiliceous compound obtained by the acid treatment of a synthetic gmelinite of composition, expressed in terms of oxides, of 1.2 $Na_2O:Al_2O_3:6.15\ SiO_2:6.2\ H_2O$, the aluminosiliceous compound analysing at 0.15 $Na_2O:0.37\ Al_2O_3:6.15\ SiO_2:3.6\ H_2O$.

The aluminosiliceous compound preferably provides, on a silica basis, from 0.1 to 15 molar percent, most preferably about 5 molar percent, of the silica component of the reaction mixture. The proportions of the other components of the reaction mixture should be chosen so that the oxide molar ratios of the components are within the following ranges:

| | |
|---|---|
| $SiO_2/Al_2O_3$ | 2 to 40 |
| $Na_2O+K_2O/SiO_2$ | 0.2 to 2.0 |
| $H_2O/Na_2O+K_2O$ | 10 to 140 |
| $Na_2O/Na_2O+K_2O$ | 0 to 1.0 | with the proviso that where the ratio of $$Na_2O/Na_2O+K_2O$$

is 1, then the $SiO_2/Al_2O_3$ ratio is less than 8. Where the $SiO_2Al_2O_3$ ratio is greater than 8, gmelinite is obtained.

Suitably, the source of the balance of the silica component of the reaction mixture may be colloidal silica or a disilicate, and the source of the balance of the alumina component may be sodium or potassium aluminate. The balance of the $Na_2O$ or $K_2O$ component may be provided by sodium or potassium hydroxide.

The product zeolite LS 101 may be crystallised from the reaction mixture under the conditions previously described in connection with the preparation of other zeolites in accordance with the invention, preferably from an agitated reaction mixture maintained at a temperature which may be within the range of from 20–120° C., advantageously within the range of from 80–120° C.

The formula for the novel crystalline zeolite LS 102, expressed in terms of oxides, is as follows:

$$0.7\text{--}1.3(d\text{Na}_2\text{O}:(1-d)\text{K}_2\text{O}):\text{Al}_2\text{O}_3:e\text{SiO}_2:f\text{H}_2\text{O}$$

where $d$ has a value of from 0 to 1, $e$ has a value of from 6 to 8 and $f$ has a value up to about 10.

Zeolite LS 102 is characterised by its composition and X-ray powder diffraction pattern. The X-ray powder diffraction data for a typical example of LS 102 are shown in Table IX. The data were obtained using a Guinier camera and copper K-alpha radiation and employing standard techniques. The X-ray powder diffraction pattern for zeolite LS 102 corresponds to that of offretite.

Zeolite LS 102 finds use as a catalyst in for example the cracking of hydrocarbons. The high silica to alumina molar ratio renders this novel zeolite particularly useful in conditions where a material of high heat stability or high acid resistance is required.

The novel zeolite LS 102 where $d$ is from 0.1 to 0.9 may be prepared using an aluminosiliceous material derived from a zeolite of the faujasite family, advantageously from such a zeolite of high silica to alumina molar ratio, such as greater than 5.

Zeolite LS 102 containing only the single cation sodium or potassium may be obtained from the combined form by ion-exchange.

In preparing the novel zeolite from a reaction mixture containing a silica component, an alumina component, a cation component and water, the aluminosiliceous compound preferably provides, on a silica basis, from 0.1 to 15 molar percent, most preferably about 5 molar percent, of the silica component of the reaction mixture. The proportions of the other components of the reaction mixture should be chosen so that the oxide molar ratios of the components are within the following ranges:

| | |
|---|---|
| $SiO_2/Al_2O_3$ | 15–30 |
| $Na_2O+K_2O/SiO_2$ | 0.3–0.6 |
| $H_2O/Na_2O+K_2O$ | 20–100 |
| $Na_2O/Na_2O+K_2O$ | 0.1–0.9 |

Suitably, the source of the balance of the silica component of the reaction mixture may be colloidal silica and the source of the balance of the alumina component may be sodium or potassium aluminate. The balance of the $Na_2O$ or $K_2O$ component may be sodium or potassium hydroxide.

The product zeolite LS 102 may be crystallised from the reaction mixture under the conditions previously described in connection with the preparation of other zeolites in accordance with the invention, preferably from an agitated reaction mixture maintained at a temperature which may be within the range of from 20–120° C., advantageously within the range of from 80–120° C.

The novel zeolite LS 102 may also be prepared by the process described and claimed in our co-pending British patent application No. 27,132/69 of even date.

The invention will now be illustrated by way of the following examples:

Example 1

This example illustrates the preparation of aluminosiliceous compounds from a zeolite of the faujasite family by treatment with various acids under a range of conditions, and shows the relationship between the effectiveness of the resulting aluminosiliceous compounds towards the preparation of zeolite X and the acid treatment conditions employed in obtaining the aluminosiliceous compounds.

The zeolite employed was a zeolite Y of the formula $Na_2O:Al_2O_3:5.2\ SiO_2:7.6\ H_2O$. A series of runs was carried out using this zeolite as the zeolite starting material and the conditions employed and the results obtained are shown in Table 1.

In each run 10 g. of the zeolite and the specified number of gram equivalents of a normal solution of the acid were used. The zeolite was slurried with a quantity of water equal to the quantity of acid solution to be employed (except in run 10 where the quantity of water was one half that quantity of acid solution) and to this slurry was added, under vigorous stirring, the required amount of the acid solution. Addition of the acid solution was effected within a period of about 10 seconds. The resulting mixture was maintained under vigorous stirring for the period of time specified in Table 1 and the product aluminosiliceous compound was then filtered from the mixture, washed with water until the wash liquor was substantially free from salts (less than 2% w./w. in the wash liquor), and then dried at the stated temperature.

The X-ray powder diffraction pattern of the aluminosiliceous compound was visually examined and, using the test procedure previously described, the effectiveness of the aluminosiliceous compound towards the production of zeolite X was determined. In the test procedure the aluminosiliceous compound constituted, on a silica basis, 1 molar percent of the silica component of the reaction mixture. The other components of the reaction mixture were, as previously described in the test procedure, such as to give a reaction mixture having a composition expressed in terms of oxide molar ratios of $$SiO_2/Al_2O_3 = 3.85$$
$$Na_2O/SiO_2 = 1.34$$

and $$H_2O/Na_2O = 47.00$$

The weight percentage of zeolite X obtained in the test procedure for each run is shown in Table 1.

Runs 1 to 5 of Table 1 show the effect, for sulphuric acid, of increasing the ratio of acid to zeolite on the effectiveness of the aluminosiliceous compound towards the production of zeolite X in the specified test procedure. The use of from 3.0 to 6.5 gram equivalents of acid per gram mole of the zeolite gives particularly effective aluminosiliceous compounds. As will be seen from the table the use of about 4.8 gram equivalents of acid per gram mole of zeolite is especially advantageous, while the use of less than 2.4 or greater than 8.0 gram equivalents of acid per gram mole of zeolite results in products of relatively low effectiveness. In theory, 1 gram equivalent of the zeolite Y would require 8 gram equivalents of acid to effect complete removal of aluminium and cation from the zeolite. Using this relationship, the above stated ranges can be expressed in terms of the theoretical quantity of acid required to effect removal of aluminum and cation.

Comparison of run 6, in which acid treatment was effected at 75° C. with runs 2 and 3 in which a temperature of 25° C. was employed shows that acid treatment may be effected within a wide range of temperatures while a comparison of run 4 with run 3 shows that a wide range of drying temperatures may be employed.

The use of hydrochloric acid is shown in runs 7 to 10.

In the above runs, the pH of the aqueous medium during acid treatment did not fall below pH 1.

Example 2

In this example, aluminosiliceous compounds were prepared in a similar manner to that described in Example 1, except that the zeolite starting material was a zeolite Y of the formula $Na_2O:Al_2O_3:4.5\ SiO_2:8.0\ H_2O$.

The conditions used and the results obtained in a series of runs are shown in Table II. In each run 10 g. of the zeolite were used and the required quantity of acid was contacted with the zeolite as described in Example 1. The relative effectiveness of the product aluminosiliceous compounds was determined as also described in Example 1.

In Example 1 using a zeolite Y of silica to alumina molar ratio of 5.2, particular effective aluminosiliceous compounds were obtained where the number of gram equivalents of acid per gram of the zeolite was from 3.0 to 6.5. In the present example using a zeolite Y of lower silica to alumina molar ratio, that is 4.5, comparable aluminosiliceous compounds were obtained within a narrower range, this range being from about 4.2 to 4.4 gram equivalents of acid per gram mole of the zeolite.

As for Example 1, the pH of the aqueous medium during acid treatment did not fall below pH 1. In so far as the pH was concerned, these runs were carried out somewhat outside the preferred conditions.

Example 3

This example illustrates the preparation of aluminosiliceous compounds by acid treatment of a zeolite X in an aqueous medium and shows the effect of controlling the pH of the aqueous medium during acid treatment upon the effectiveness of the resulting aluminosiliceous compounds.

In this example a series of runs was carried out, as shown in Table III, using a zeolite X of the formula $Na_2O:Al_2O_3:2.7SiO_2:6.5H_2O$. In runs 21 to 24, 50 g. of the zeolite X were slurried with 270 ml. of water and to the vigorously stirred slurry were added 270 ml. of a normal hydrochloric acid solution in the manner described below. In run 25, a solution of hydrochloric acid buffered to pH 3.2 was prepared by mixing 193 ml. of normal hydrochloric acid solution with 200 ml. of a molar solution of sodium acetate, and to this buffered solution was added under vigorous stirring 20.2 g. of the zeolite X. Addition of the zeolite was effected over period of about 10 seconds, and the resulting mixture was maintained under vigorous stirring for 30 minutes after which time the pH was 4.4.

The product aluminosiliceous compound in each case was filtered off, washed with water and then dried at 25° C. The effectiveness of the aluminosiliceous compound towards the production of zeolite X was determined as described in Example 1. The results obtained using the aluminosiliceous compound to provide, on a silica basis, 1 molar percent and 5 molar percent of the silica component of the reaction mixture are shown in Table III.

In run 21, the hydrochloric acid solution was added to the zeolite slurry in a continuous manner and within a period of about 10 seconds and the resulting mixture was maintained under vigorous stirring for a further period of 30 minutes. Following addition of the hydrochloric solution, the pH of the resulting mixture was initially about 1.5 and thereafter rose slowly. During the early stages of this acid treatment process the mixture had a pH of less than 3. From Table III it will be seen that an aluminosiliceous compound of relatively low effectiveness towards the production of zeolite X was obtained.

In runs 22 to 24, the pH of the aqueous medium containing the zeolite was maintained during acid treatment at a value above pH 3 by controlling the manner of addition of the hydrochloric acid solution to the zeolite slurry. In each run the hydrochloric acid solution was added intermittently to the zeolite slurry and over a period of from 30 minutes in run 22 to 1 hour in run 23 and 4 hours in run 24. For convenience, addition of the hydrochloric acid solution was effected by an electric pump whose operation was controlled by a glass electrode positioned in the zeolite slurry. When the pH of the zeolite slurry, as indicated by the glass electrode, was above an upper limit the motor of the pump was energised and acid solution was added to the slurry, while when the pH fell below a lower limit the motor was de-energised and addition of the acid solution ceased. In this manner the pH of the zeolite slurry was maintained during acid treatment above a lower value, varying in a cyclic manner between this lower value and an upper value. For run 22 the upper and lower values were respectively 3.0 and 4.0, for run 23 the values were 3.4 and 3.6 and for run 24 the pH was maintained at substantially pH 3.5.

As will be seen from Table III, when the pH of the aqueous medium containing the zeolite was maintained at above 3.0 particularly effective aluminosiliceous compounds were obtained.

The aluminosiliceous compound obtained in run 25 was shown on analysis to have a composition corresponding to the formula $0.44\ Na_2O:0.85\ Al_2O_3:2.7\ SiO_2:6.5\ H_2O$, showing that during acid treatment 15% of the aluminium had been removed from the zeolite X starting material.

Example 4

This example illustrates the preparation of zeolite X from aluminosiliceous compounds derived from a zeolite of the faujasite family and shows the effectiveness of the aluminosiliceous compounds as compared with preparations in which such compounds are absent.

A series of zeolite X preparations was carried out as shown in Table IV. In runs 32 to 35 an aluminosiliceous compound was employed in the preparation, while in runs 36 to 41 no aluminosiliceous compound was present.

For each run a zeolite reaction mixture was prepared having a composition, expressed in terms of oxide molar ratios, of:

$SiO_2/Al_2O_3$ ------------------------------ 3.85
$Na_2O/SiO_2$ ------------------------------ 1.34
$H_2O/Na_2O/Na_2O$ ------------------------- 47.00

In this reaction mixture the source of alumina was a sodium aluminate of approximate composition 1.3 $Na_2O:Al_2O_3:12\ H_2O$ and the source of any additional $Na_2O$ was sodium hydroxide. The source of the silica component of the reaction mixture was as shown in Table IV. Where sodium disilicate was used, this was a material of approximate composition $Na_2O:2.07\ SiO_2:14.1\ H_2O$ and where colloidal silica was used, this was a colloidal silica sold under the trade designation Syton 2X (Monsanto Chemicals). In run 40, the "active" silica was a material prepared in accordance with British patent application No. 1,193,254 and having an activity rating, as determined by the test procedure given in that application, of 1000 units. The aluminosiliceous compounds employed in runs 32 and 35 were prepared as follows, each preparation being carried out at ambient temperature:

Runs 32 and 33.—The aluminosiliceous compound was prepared from a zeolite Y of silica to alumina molar ratio of 4.5 and of the formula $Na_2O:Al_2O_3:4.5\ SiO_2:7.6\ H_2O$.

20 g. of the zeolite Y were slurried with 150 ml. of water and to the vigorously stirred slurry were added 150 ml. of an aqueous normal solution of sulphuric acid. Addition of the acid was effected over a period of about 10 seconds after which the resulting mixture was vigorously stirred for 15 minutes. The product aluminosiliceous compound was filtered, washed with water until the wash liquor was substantially free from salts (less than 2% w./w.) and then dried at ambient temperature.

Run. 34.—In this run the zeolite starting material was a zeolite Y of silica to alumina molar ratio of 5.2 and of the formula $Na_2O:Al_2O_3:5.2\ SiO_2:7.6\ H_2O$.

The aluminosiliceous compound was prepared and separated in a similar manner to that described for runs 32 and 33, using 20 g. of the zeolite Y, 137 ml. of water and 137 ml. of an aqueous normal solution of sulphuric acid. The mixture of acid and zeolite was maintained under stirring for 30 minutes.

The product aluminosiliceous compound had a composition corresponding to the formula $0.16\ Na_2O:0.73\ Al_2O_3:5.2\ SiO_2:8.0\ H_2O$, showing that on acid treatment 27% of the aluminium content of the zeolite Y starting material had been removed.

Run 35.—The zeolite starting material was that specified in run 34. 1000 g. of the zeolite Y were slurried with 9000 ml. of water and to this slurry was added under vigorous stirring a solution of 184 ml. of concentrated sulphuric acid (98% w./w. sulphuric acid) in 4000 ml. of water. The resulting mixture was maintained under vigorous stirring for 30 minutes and the product aluminosiliceous compound was separated, washed and dried as previously described.

Using the above specified source materials, the zeolites reaction mixture for each run was prepared in the manner previously described in connection with the test procedure for determining the effectiveness of an aluminosiliceous compound. The reaction mixture was then heated to a temperature of 95°–100° C. and maintained at this temperature under reflux for the period of time specified in Table IV. The product obtained was filtered from the reaction mixture, washed to a pH of 10.5, and then dried at 100° C. The zeolite product was identified by X-ray powder diffraction analysis and the results are shown in Table IV. X-ray powder diffraction data for zeolite X, B and C are shown in Table V and for zeolite Y in Table VI.

As is shown by run 37, in the absence of aluminosiliceous compounds the product obtained from the reaction mixture is a mixture of zeolite B, zeolite C and amorphous material. The presence of either sodium zeolite Y itself or hydrogen zeolite Y in the reaction mixture has little affect upon the course of the zeolite reaction as is shown by runs 36 and 41 respectively. Aluminosiliceous compounds, however, direct the course of the reaction away from the normal product and as is shown by runs 32–25 enable pure zeolite X to be prepared within a reaction period of as little as two hours. The specified "active" silica in run 40, similarly gives pure zeolite X, but is less readily prepared than are the aluminosiliceous compounds of the present invention. Further, as will be shown in later examples, a wide range of zeolites may be prepared from the aluminosiliceous compounds, the particular zeolite in any particular case being dependent upon the zeolite starting material from which the aluminosiliceous compound was derived.

Runs 38 and 39 show that although pure zeolite X may be prepared using colloidal silica, it is necessary to avoid agitation and to use unduly long reaction periods.

Example 5

This example illustrates the preparation of zeolite Y using an aluminosiliceous compound obtained from a zeolite of the faujasite family.

The aluminosiliceous compound employed was that prepared from a zeolite Y of silica to alumina molar ratio of 5.2 as described in connection with run 35 of Example 4.

A reaction mixture was prepared having a composition, expressed in terms of oxide molar ratios, of:

$SiO_2/Al_2O_3$ ------------------------------ 20.0
$Na_2O/SiO_2$ ------------------------------ 0.5
$H_2O/Na_2O$ ------------------------------ 36.1

On a silica basis, the aluminosiliceous compound provided 5 molar percent of the silica component of the reaction mixture, the remainder being colloidal silica. The source of alumina, other than the aluminosiliceous compound, was a sodium aluminate of approximate composition 1.3 $Na_2O:Al_2O_3:12\ H_2O$. The balance of the $Na_2O$ component was provided by sodium hydroxide.

The reaction mixture was heated to a temperature of 90–100° C. and maintained at this temperature under reflux and with vigorous stirring for a period of 5 hours. At the end of the period the resulting crystalline product was filtered from the reaction mixture, washed to a pH of 10.5 and then dried at 100° C. By X-ray powder diffraction analysis the product was shown to be substantially pure zeolite Y (greater than 95%). Chemical analysis of product gave a formula of $Na_2O:Al_2O_3:4.2\ SiO_2:6.9\ H_2O$.

Example 6

This example illustrates the preparation of an aluminosiliceous compound from zeolite B, a zeolite having a structure based on a four-membered ring system, and the subsequent use of the aluminosiliceous compound in the preparation of zeolites also based on a four-membered ring, in this example zeolite B itself.

The aluminosiliceous compound was prepared by slurrying 20 g. of a zeolite B having the formula $Na_2O:Al_2O_3:3.2\ SiO_2:3.4\ H_2O$ with 200 ml. of water, adding to the vigorously stirred slurry 200 ml. of an aqueous normal solution of sulphuric acid over a period of about 10 seconds and maintaining the resulting mixture under vigorous stirring for a period of 15 minutes. The relative proportions of zeolite B and the acid solution were such as to give 0.5 gram equivalents of acid per gram mole of zeolite B. During acid treatment in this manner, the pH of the aqueous medium did not fall below pH 1. The solid material was filtered from the reaction mixture, washed with water until substantially free from soluble salts (less than 2% w./w. in the wash liquor) and then dried at ambient temperature. The X-ray diffraction pattern of the aluminosiliceous compound obtained in this manner was that for zeolite B and amorphous material and indicated the loss of about 50% of the crystallinity of the zeolite B starting material.

In preparing zeolite B from this aluminosiliceous compound, a reaction mixture having the following composition, expressed in terms of oxide molar ratios, was used:

$SiO_2/Al_2O_3$ _____ 3.85
$Na_2O/SiO_2$ _____ 1.34
$H_2O/Na_2O$ _____ 47.00

In this reaction mixture, the aluminosiliceous compound constituted on a silica basis, 1 molar percent of the silica component of the reaction mixture, the balance of the silica component being provided by sodium disilicate liquor of approximate composition $Na_2O:2.07$ $SiO_2:14.1$ $H_2O$. The source of alumina was sodium aluminate liquor of approximate composition 1.3 $Na_2O:Al_2O_3:12$ $H_2O$ and the source of additional $Na_2O$ was a sodium hydroxide solution. This reaction mixture was heated at 90–100° C. for 3 hours under reflux and with continuous stirring. The product which crystallised from the reaction mixture was filtered off, washed with water to a pH of 10.5 and dried at 100° C. and was shown by its X-ray diffraction pattern to be substantially pure zeolite B (greater than 95% zeolite B).

For comparison, two reaction mixtures were prepared having the above specified oxide molar ratios, but the aluminosiliceous compound in one case was replaced by an equivalent amount of the zeolite B starting material and in the other by an equivalent additional amount of sodium disilicate. The reaction mixtures were each heated for 3 hours at 90–100° C. and the products separated as above. Each product was shown by its X-ray diffraction pattern to be zeolite B together with major amounts of zeolite C and amorphous material.

Example 7

In this example mordenite, a zeolite having a structure based on four-membered and five-membered rings, was treated to give an aluminosiliceous compound and this aluminosiliceous compound was used to prepare zeolite B a zeolite, as previously stated, having a structure based on four-membered rings.

The aluminosiliceous compound was prepared by slurrying 40 g. of a mordenite of the formula $Na_2:Al_2O_3:10.0$ $SiO_2:5.5$ $H_2O$ with 37 ml. of water and adding to the vigorously stirred slurry 37 ml. of an aqueous 5 N solution of sulphuric acid over a period of about 10 seconds and maintaining the resulting mixture under vigorous stirring for a period of 30 minutes. The resulting aluminosiliceous compound was filtered, washed and dried. Its X-ray diffraction pattern indicated the loss during acid treatment of about 15–50% of the crystallinity of the mordenite starting material.

A zeolite reaction mixture was prepared as described in Example 6, having a composition expressed in terms of oxide molar ratios of $SiO_2/Al_2O_3=3.85$, $Na_2O/SiO_2=1.34$, $H_2O/Na_2O=47.00$ the aluminosiliceous compound obtained from mordenite constituting, on a silica basis, 1 molar percent of the silica component of the reaction mixture. This reaction mixture was treated and the product separated in the manner described in Example 6. The zeolite product was shown by X-ray diffraction analysis to be substantially pure zeolite B (greater than 95% zeolite B).

As for Example 6, comparative experiments were carried out using mordenite itself in one case and additional sodium disilicate in another case in place of the aluminosiliceous compound. In each case the product obtained was zeolite B together with major amounts of zeolite C and amorphous material.

Example 8

This example illustrates the direct preparation, using an aluminosiliceous compound, of a zeolite containing more than one cation, in this example sodium and lithium.

The aluminosiliceous compound used was that prepared from a zeolite Y as described in run 35 of Example 4. Two preparations of a Na/Li zeolite Y were carried out using reaction mixtures having the following compositions, expressed in terms of oxide molar ratios:

|  | Run 41 | Run 42 |
|---|---|---|
| $SiO_2/Al_2O_3$ | 20.0 | 20.0 |
| $Na_2O+Li_2O/SiO_2$ | 0.5 | 0.5 |
| $H_2O/Na_2O+Li_2O$ | 36.1 | 36.1 |
| $Li_2O/Na_2O+Li_2O$ | 0.1 | 0.2 |

In each run, the aluminosiliceous compound constituted, on a silica basis, 5 molar percent of the silica component of the reaction mixture, the balance being provided by a colloidal silica analysing at $SiO_2.7.8$ $H_2O$ and sold under the trade designation Syton 2X (Monsanto Chemicals). The source of the alumina component, other than the aluminosiliceous compound, was provided by a sodium aluminate of the approximate composition 1.3 $Na_2O:Al_2O_3:12$ $H_2O$ while the balance of the $Na_2O$ component and the required amount of the $Li_2O$ component were provided by the corresponding metal hydroxides. In preparing the reaction mixture, the sodium hydroxide and lithium hydroxide were dissolved in the required amount of $H_2O$ and to this solution was added, under stirring, the colloidal silica. The mixture was stirred until homogeneous and the aluminosiliceous compound was then added followed by the sodium aluminate, the additions again being made under stirring.

For each run the prepared reaction mixture was heated to 90°–100° C. and maintained at this temperature under reflux and with stirring for a period of five hours. After this time, the crystalline product which was obtained was filtered, washed with water to a pH of 10.5 and then dried at 100° C.

The product for each run was a sodium-lithium zeolite and was shown by X-ray diffraction analysis to be a zeolite Y.

Example 9

In this example synthetic gmelinite, a zeolite having a structure based on six-membered rings, was prepared from an aluminosiliceous compound obtained from a zeolite Y.

The aluminosiliceous compound employed in this preparation was that obtained by acid treatment of a zeolite Y of the formula $Na_2:Al_2O_3:5.2$ $SiO_2:7.6$ $H_2O$ as described for run 35 of Example 4.

A reaction mixture was prepared using the following quantities of materials:

G.
Aluminosiliceous compound, prepared as above __ 8.0
Colloidal silica ("Syton" 2X—$SiO_2:7.8$ $H_2O$) ___ 400.0
Sodium aluminate (1.3 $Na_2O:Al_2O_3:12$ $H_2O$) ___ 79.6
Sodium hydroxide _____ _____ 21.0
Water _____ 100.0

The sodium hydroxide was dissolved in the water and to the stirred solution was added the colloidal silica. Stirring was continued until a homogeneous mixture was obtained, and to the stirred mixture was then added the aluminosiliceous compound followed by the sodium aluminate. The composition of the resulting reaction mixture, expressed in terms of oxide molar ratios, was:

$SiO_2/Al_2O_3$ .................................................... 10.0
$Na_2O/SiO_2$ ..................................................... 0.3
$H_2O/Na_2O$ ..................................................... 40.0

This reaction mixture was then heated with stirring to 100° C. and maintained at this temperature under reflux and with stirring for a period of 64 hours. The crystalline product obtained after this time was filtered from the reaction mixture washed to a pH of 10 and then dried. The crystalline zeolite so obtained had a formula, expressed in terms of oxides, of $$1.2\ Na_2O:Al_2O_3:6.15\ SiO_2:6.2\ H_2O$$

and its X-ray diffraction pattern corresponded to that of gmelinite.

Example 10

This example illustrates the preparation of the novel zeolites LS 101.

The aluminosiliceous compound employed in this preparation was derived from the synthetic gmelinite prepared in Example 9. A slurry of 50 g. of this gmelinite (formula $1.2\ Na_2O:Al_2O_3:6.15\ SiO_2.6.2\ H_2O$) and 465 ml. of water was prepared and to the vigorously stirred slurry were added over a period of 10 seconds 465 ml. of an aqueous normal solution of sulphuric acid, corresponding to a ratio of 6.0 gram equivalents of acid per gram mole of the zeolite. The mixture was maintained under stirring for 30 minutes and the resulting aluminosiliceous compound filtered from the mixture, washed with $H_2O$ until substantially free from salts and then dried at ambient temperature. The aluminosiliceous compound was analysed and found to have a formula corresponding to $0.15\ Na_2O:0.37Al_2O_3:6.15\ SiO_2:3.6\ H_2O$. During acid treatment 63% of the aluminium content of the zeolite starting material had thus been removed.

A reaction mixture was prepared using the following quantities of materials:

|  | G. |
|---|---|
| Aluminosiliceous compound, prepared as above | 2.0 |
| Sodium disilicate ($Na_2O:2.0\ SiO_2:14\ H_2O$) | 82.0 |
| Colloidal silica ("Syton" 2X—$SiO_2:7.8\ H_2O$) | 40.0 |
| Sodium aluminate ($1.3\ Na_2O:Al_2O_3:12\ H_2O$) | 39.8 |
| Potassium hydroxide | 21.3 |
| Water | 362.0 |

The potassium hydroxide was dissolved in the water and to this stirred solution was added the sodium disilicate and colloidal silica. Once a homogeneous mixture was obtained, the aluminosiliceous compound was added to the stirred mixture followed by the sodium aluminate. The composition of the resulting reaction mixture, expressed in terms of oxide molar ratios, was:

$SiO_2/Al_2O_3$ .................................................... 5.85
$Na_2O+K_2O/SiO_2$ ............................................ 0.88
$H_2O/Na_2O+K_2O$ ........................................... 50.0
$Na_2O/Na_2O+K_2O$ .......................................... 0.61 the aluminosiliceous compound providing, on a silica basis, 5 molar percent of the silica component of the reaction mixture.

The reaction mixture was heated with stirring to 100° C., and maintained at this temperature under reflux and with stirring for a period of 5 hours. The crystalline product was filtered from the reaction mixture, washed to a pH of 10 and then dried. The crystalline zeolite so obtained had an X-ray diffraction pattern as shown in Table VII and on analysis was shown to have a formula, expressed in terms of oxides, of:

$$0.20\ Na_2O:0.83\ K_2O:Al_2O_3:3.3\ SiO_2:4.5\ H_2O$$

Using an absorption balance and employing standard techniques, the following absorption data were obtained:

Static butane capacity—1.2% w./w. at 25° C. and 760 mm.
Static iso-butane capacity—1.8% w./w. at 25° C. and 760 mm.
Static $CO_2$ capacity—10% w./w. at 25° C. and 100 mm.

Using the method specified in British Standard Specification No. 3,482 and a material consisting of a mixture of 90% w./w. zeolite LS 101 and 10% w./w. of a binder, the mixture having been calcined at 550° C. and being of 8–16 B.S.S. mesh size, the material was found to have a water capacity of 20% w./w.

The zeolite LS 101 was subjected to ion-exchange at a temperature of 90° C. for a period of 1 hour using a calcium chloride solution containing 2 gram moles of calcium chloride per litre of solution. The relative proportions of the zeolite and solution were such that 2 gram moles of calcium chloride were employed per gram mole of zeolite. The zeolite LS 101, ion-exchanged in this manner had a formula, expressed in terms of oxides, of:

$$0.05\ Na_2O:0.47\ K_2O:0.53\ CaO:Al_2O_3:3.3\ SiO_2:4.6\ H_2O$$

A series of other preparations of zeolite LS 101 which were carried out is shown in Table VIII. The aluminosiliceous compound in each case was that obtained from synthetic gmelinite in the manner already described. In the reaction mixture, the aluminosiliceous compound constituted, on a silica basis, 5 molar percent of the silica component. The composition of the reaction mixture and the reaction time for each run are shown in Table VIII, the other conditions being as previously specified.

The crystalline product obtained in each run had an X-ray powder diffraction pattern substantially as set forth in Table VII. For runs 45 and 48, the product was analysed and the corresponding formulae are shown in Table VIII.

Example 11

This example illustrates the preparation of the novel zeolite LS 102.

The aluminosiliceous compound employed in this preparation was that obtained by acid treatment of a zeolite Y of the formula $Na_2O:Al_2O_3:5.2\ SiO_2:7.6\ H_2O$ as described for run 35 of Example 4.

The conditions employed in a series of zeolite preparations are shown in Table X. In each run the aluminosiliceous compound constituted 7, on a silica basis, 5 molar percent of the silica component of the reaction mixture. The balance of the silica component was provided by colloidal silica sold under the trade designation Syton 2X, while the balance of the alumina component was provided by sodium or potassium aluminate of composition $1.3\ Na_2O:Al_2O_3:12\ H_2O$ (or $1.3\ K_2O:Al_2O_3:12\ H_2O$). The remainder of the cation was provided by sodium or potassium hydroxide. The alkali metal hydroxide was dissolved in the required amount of water and to this was added the colloidal silica to give a mixture which was stirred until homogeneous. To this mixture was added, under stirring, the aluminosiliceous compound followed by the aluminate. The resulting reaction mixture was heated at 90–100° C. under reflux, with or without agitation as specified in Table X, until the crystalline product was obtained. The product was filtered from the mixture, washed until the wash liquor had a pH of 10.5 and then dried at 100° C.

The zeolite product for run 51 had a formula of 0.35 $Na_2O$:0.58 $K_2O$:$Al_2O_3$:6.5 $SiO_2$:8.3 $H_2O$ and the X-ray powder diffraction pattern shown in Table IX. The products obtained in runs 52 and 53 had an X-ray diffraction pattern corresponding to the zeolite compositions shown in Table X.

TABLE I.—PREPARATION OF ALUMINOSILICEOUS COMPOUNDS FROM A ZEOLITE Y OF THE FORMULA $Na_2O$:$Al_2O_3$:5.2$SiO_2$:7.6 $H_2O$

| | | Acid treatment conditions | | | | | Aluminosiliceous product | |
| --- | --- | --- | --- | --- | --- | --- | --- | --- |
| Run No. | Acid | Initial normality of acid in slurry, gram equivalents per litre | Ratio of acid to zeolite in slurry, gram equivs. of acid per gram mole of zeolite | Temperature of acid treatment, °C. | Duration of acid treatment, mins. | Drying temperature, °C. | X-ray diffraction pattern | Effectiveness towards zeolite X preparation, weight percent zeolite X obtained in specified test procedure |
| 1 | Sulphuric acid | 0.5 | 2.4 | 25 | 5 | 25 | Zeolite Y plus amorphous | 20 |
| 2 | do | 0.5 | 3.2 | 25 | 5 | 25 | do | 70 |
| 3 | do | 0.5 | 4.8 | 25 | 5 | 25 | Amorphous plus zeolite Y | 90 |
| 4 | do | 0.5 | 4.8 | 25 | 5 | 100 | do | 90 |
| 5 | do | 0.5 | 8.0 | 25 | 5 | 25 | Amorphous plus trace zeolite Y | 10 |
| 6 | do | 0.5 | 4.0 | 75 | 5 | 25 | Zeolite Y plus amorphous | 80 |
| 7 | Hydrochloric acid | 0.5 | 4.0 | 25 | 5 | 25 | do | 85 |
| 8 | do | 0.5 | 6.4 | 25 | 5 | 25 | Amorphous plus some zeolite Y | 30 |
| 9 | do | 0.5 | 9.6 | 25 | 5 | 25 | Amorphous | 5 |
| 10 | do | 0.67 | 5.3 | 25 | 30 | 25 | Amorphous plus zeolite Y | (1) |

[1] Substantially pure zeolite X (greater than 95%.)

TABLE II.—PREPARATION OF ALUMINOSILICEOUS COMPOUNDS FROM ZEOLITE Y OF THE FORMULA $Na_2O$:$Al_2O_3$:4.5 $SiO_2$:8.0$H_2O$

| | | Acid treatment conditions | | | | | Aluminosiliceous product | |
| --- | --- | --- | --- | --- | --- | --- | --- | --- |
| Run No. | Acid | Initial normality of acid in slurry, gram equivalents per litre | Ratio of acid to zeolite in slurry, gram equivs. of acid per gram mole of zeolite | Temperature of acid treatment, °C. | Duration of acid treatment, mins. | Drying temperature, °C. | X-ray diffraction pattern | Effectiveness towards zeolite X preparation, weight percent zeolite X obtained in specified test procedure |
| 12 | Sulphuric | 0.5 | 3.2 | 25 | 30 | 25 | Zeolite Y plus amorphous | 20 |
| 13 | do | 0.5 | 4.0 | 25 | 5 | 25 | do | 25 |
| 14 | Hydrochloric | 0.5 | 4.08 | 25 | 5 | 25 | do | 30 |
| 15 | do | 0.5 | 4.24 | 25 | 5 | 25 | do | 60 |
| 16 | do | 0.5 | 4.40 | 25 | 5 | 25 | do | 30 |
| 17 | do | 0.5 | 4.56 | 25 | 5 | 25 | do | 25 |
| 18 | do | 0.5 | 4.72 | 25 | 5 | 25 | do | 25 |
| 19 | Sulphuric | 0.5 | 4.80 | 25 | 5 | 25 | do | 25 |
| 20 | do | 0.5 | 5.60 | 25 | 5 | 25 | do | 15 |

TABLE III.—PREPARATION OF ALUMINOSILICEOUS COMPOUNDS FROM A ZEOLITE OF THE FORMULA $Na_2O$:$Al_2O_3$:2.7 $SiO_2$:6.5 $H_2O$

| | | | | Duration of acid treatment | | | Effectiveness of aluminosiliceous compound towards zeolite X production, weight percent zeolite X obtained in specified test | |
| --- | --- | --- | --- | --- | --- | --- | --- | --- |
| Run No. | Acid | Ratio of acid to zeolite, gram equivalents of acid per gram mole of zeolite | Mode of mixing | Time of addition of acid to zeolite | Further contact period, mins. | Minimum pH during acid treatment | Using 1 molar percent | Using 5 molar percent |
| 21 | Hydrochloric acid | 2.4 | N.I. HCl added to zeolite slurry | 10 seconds | 30 | 1.5 | 5 | 5 |
| 22 | do | 2.4 | do | 30 mins | | 3.0 | 50 | 80 |
| 23 | do | 2.4 | do | 1 hour | | 3.4 | 60 | 90 |
| 24 | do | 2.4 | do | 4 hours | | 3.5 | 60 | 90 |
| 25 | do | 4.0 | Zeolite added to specified solution of HCl buffered to pH 3.2. | | 30 | 3.2 | 60 | 90 |

TABLE IV.—COMPARATIVE PREPARATIONS OF ZEOLITE X

| | | Zeolite X preparation | | | |
| --- | --- | --- | --- | --- | --- |
| Run No. | Source of aluminosiliceous compound | Reaction mixture—silica component, mole percent | Reaction stirred | Duration at 90–100° C. hours | Reaction product composition, weight percent |
| 32 | Zeolite Y; $SiO_2/Al_2O_3$=4.5 | 90% sodium disilicate, 10% aluminosiliceous compound. | Yes | 3 | Substantially pure zeolite X (greater than 95%). |
| 33 | do | 99% sodium disilicate, 1% aluminosiliceous compound. | Yes | 3 | 60% zeolite X, remainder zeolites B and C. |
| 34 | Zeolite Y; $SiO_2/Al_2O_3$=5.2 | do | Yes | 3 | 90% zeolite X, remainder zeolites B and C. |
| 35 | do | 95% sodium disilicate, 5% aluminosiliceous compound. | Yes | 2 | Substantially pure zeolite X (greater than 95%) $SiO_2/Al_2O_3$=2.7. |
| 36 | | 99% sodium disilicate, 1% zeolite Y | Yes | 3 | Zeolite B plus zeolite C plus trace zeolite X (less than about 5%). |
| 37 | | 100% sodium disilicate | Yes | 3 | Zeolite B plus zeolite C plus amorphous. |
| 38 | | 100% colloidal silica | Yes | 5 | Amorphous. |
| 39 | | do | No | 240 | Substantially pure zeolite X (greater than 95%). |
| 40 | | 99% sodium disilicate, 1% 'active' silica. | Yes | 3 | Do. |
| 41 | | 99% sodium disilicate, 1% hydrogen zeolite Y. | Yes | 3 | Zeolite B plus zeolite C plus trace zeolite X (less than about 5%). |

TABLE V.—X-RAY POWDER DIFFRACTION PATTERN OF ZEOLITES X, B AND C $d$ is the interplanar spacing in angstrom units. R.I. is the relative intensity, 10 I/I₀, determined visually, where I is the observed peak height and I₀ is the peak height of the strongest line or peak.

| | | | | | | | | | | | | | | | | | |
|---|---|---|---|---|---|---|---|---|---|---|---|---|---|---|---|---|---|
| Zeolite X; SiO₂/Al₂O₃=2.7 | d | 14.5 | 8.8 | 7.5 | 5.7 | 4.8 | 4.4 | 3.95 | 3.78 | 3.30 | 3.02 | 2.90 | 2.85 | 2.78 | 2.70 | 2.62 | 2.58 |
| | R.I. | 10 | 9 | 6 | 9 | 4 | 4 | 2 | 9 | 8 | 4 | 4 | 8 | 6 | 2 | 7 | 4 |
| | d | 2.52 | 2.38 | 2.22 | 2.19 | 2.17 | 2.09 | 1.92 | 1.90 | 1.84 | 1.80 | 1.77 | 1.74 | 1.70 | 1.61 | 1.58 | 1.55 |
| | R.I. | 2 | 6 | 2 | 4 | 4 | 4 | 4 | 4 | 2 | 2 | 4 | 4 | 6 | 2 | 6 | 2 |
| Zeolite B | d | 7.1 | 5.0 | 4.1 | 3.18 | 2.90 | 2.68 | 2.52 | 2.36 | 2.23 | 1.96 | 1.76 | 1.71 | 1.66 | 1.62 | 1.58 | 1.54 |
| | R.I. | 8 | 7 | 8 | 10 | 3 | 8 | 2 | 4 | 1 | 5 | 5 | 5 | 5 | 4 | 3 | 4 |
| | d | 1.48 | 1.41 | 1.38 | 1.36 | 1.23 | | | | | | | | | | | |
| | R.I. | 4 | 4 | 4 | 4 | 4 | | | | | | | | | | | |
| Zeolite C [1] | d | 6.67 | 4.8 | 3.9 | 3.0 | | | | | | | | | | | | |
| | R.I. | 10 | 2.5 | 5 | 7 | | | | | | | | | | | | |

[1] The diffraction lines of zeolite C are always rather diffuse and it has been observed that this material is often metastable and often changes to zeolite B even in the solid state.

TABLE VI.—X-RAY POWDER DIFFRACTION PATTERN OF ZEOLITE X (SiO₂/Al₂O₃=5.3)

$d$ is the interplanar spacing in angstrom units, and the relative intensity, 100 $I/I_0$, is calculated from I the measured peak height and Io the measured peak height of the strongest line or peak.

| $d$: | Relative intensity |
|---|---|
| 14.50 | 100 |
| 8.80 | 20 |
| 7.50 | 15 |
| 5.65 | 20 |
| 4.76 | 10 |
| 4.40 | 10 |
| 3.90 | 5 |
| 3.78 | 20 |
| 3.56 | 5 |
| 3.45 | 10 |
| 3.29 | 20 |
| 3.01 | 10 |
| 2.90 | 15 |
| 2.84 | 30 |
| 2.73 | 10 |
| 2.69 | 5 |
| 2.61 | 10 |
| 2.58 | 10 |
| 2.37 | 10 |
| 2.21 | 5 |
| 2.18 | 10 |
| 2.16 | 5 |
| 2.12 | 5 |
| 2.08 | 5 |
| 2.04 | 5 |
| 1.98 | 5 |
| 1.91 | 5 |
| 1.89 | 5 |
| 1.83 | 5 |
| 1.80 | 5 |
| 1.76 | 5 |
| 1.74 | 10 |
| 1.69 | 10 |
| 1.65 | 5 |
| 1.58 | 10 |

TABLE VII.—X-RAY POWDER DIFFRACTION PATTERN OF ZEOLITE LS 101

$d$ is the interplanar spacing in angstrom units, and the relative intensity 100 $I/I_0$ is calculated from I the measured peak height and $I_0$ the measured peak height of the strongest line or peak.

| $d$: | Relative intensity |
|---|---|
| 12.18 | 35 |
| 9.90 | 30 |
| 6.91 | 30 |
| 5.68 | 25 |
| 5.12 | 40 |
| 4.31 | 50 |
| 3.97 | 40 |
| 3.64 | 15 |
| 3.44 | 20 |
| 3.32 | 15 |
| 3.14 | 25 |
| 2.93 | 100 |
| 2.60 | 40 |
| 2.29 | 30 |
| 2.15 | 15 |
| 2.09 | 25 |
| 1.91 | 10 |
| 1.82 | 40 |
| 1.72 | 35 |
| 1.71 | 30 |
| 1.65 | 15 |
| 1.57 | 10 |
| 1.53 | 10 |
| 1.49 | 10 |
| 1.43 | 20 |
| 1.32 | 15 |
| 1.28 | 15 |
| 1.21 | 10 |
| 1.18 | 15 |

TABLE VIII.—PREPARATION OF ZEOLITE LS 101

| Run No. | Reaction mixture—Oxide mole ratios of components | | | | Reaction time, hours | Zeolite product X-ray powder diffraction pattern | Composition |
|---|---|---|---|---|---|---|---|
| | SiO₂/Al₂O₃ | Na₂O+K₂O/ SiO₂ | H₂O/ Na₂O+K₂O | Na₂O/ Na₂O+K₂O | | | |
| 45 | 2 | 1.65 | 70 | 0 | 48 | Zeolite LS 101 | 1.1K₂O:Al₂O₃:2.3SiO₂: 3.8H₂O. |
| 46 | 5 | 0.5 | 70 | 1 | 16 | ...do... | Not determined. |
| 47 | 6.85 | 0.77 | 50 | 1 | 3 | ...do... | Do. |
| 48 | 14 | 0.5 | 40 | 0 | 24 | ...do... | 1.2K₂O:Al₂O₃:5.4SiO₂: 6.8H₂O |
| 49 | 20 | 0.35 | 40 | 0.67 | 16 | ...do... | Not determined. |

TABLE IX.—X-RAY POWDER DIFFRACTION PATTERN OF ZEOLITE LS 102

$d$ is the interplanar spacing in angstrom units, and the relative intensity 100 $I/I_0$ is obtained from I the observed peak height and $I_0$ the peak height of the strongest line or peak. The relative intensity is expressed in terms of symbols, where v.s.—very strong
s.—strong
m.—medium
w.—weak
v.w.—very weak

| $d$: | Relative intensity |
|---|---|
| 12.0 | v.s. |
| 7.8 | m. |
| 6.8 | s. |
| 6.5 | w. |
| 5.6 | v.w. |
| 5.4 | v.w. |
| 4.7 | w. |
| 4.4 | m. |
| 4.15 | w. |
| 3.82 | w. |
| 3.79 | v.s. |
| 3.60 | s. |
| 3.32 | w. |
| 3.15 | m. |
| 2.92 | v.w. |
| 2.85 | v.s. |
| 2.67 | w. |
| 2.48 | m. |
| 2.20 | v.w. |
| 2.12 | v.w. |
| 1.90 | m. |
| 1.83 | w. |
| 1.76 | m. |
| 1.68 | v.w. |
| 1.64 | m. |
| 1.55 | w. | therefrom and to produce an aluminosiliceous compound retaining at least 1% crystallinity;

(b) reacting in an aqueous reaction mixture and in proportions within the reactant limits for the crystalline synthetic zeolite, a siliceous component, an alumina component and an alkali metal component, an amount up to 15 molar percent on a silica basis of the siliceous component being provided by the crystalline aluminosiliceous compound formed in step (a) and (c) separating the solid crystalline synthetic zeolite product.

2. A process as claimed in claim 1 wherein the reaction is effected at a temperature of from 20° C. to 120° C.

3. A process as claimed in claim 1 wherein the reaction mixture is agitated.

4. A process as claimed in claim 1 wherein the aluminosiliceous compound is produced by treating the crystalline aluminosilicate in an aqueous medium with acid to remove, partially, the aluminium therefrom.

5. A process as claimed in claim 4 wherein the aqueous medium consists essentially of an aqueous solution of an acid.

6. A process as claimed in claim 5 wherein the acid is a mineral acid or a strong organic acid.

7. A process as claimed in claim 6 wherein the aqueous medium also contains a buffer.

8. A process as claimed in claim 5 wherein the acid is a mineral acid and it is used in from 3 to 6.5 g. equivalents per g. mole of crystalline aluminosilicate.

9. A process as claimed in claim 8 wherein the treatment of the crystalline aluminosilicate is conducted at a temperature of from 10° C. to 80° C.

10. A process as claimed in claim 5 wherein to facilitate separation of the aluminosiliceous compound from the aqueous medium silica is used as a filtration aid.

11. A process as claimed in claim 5 wherein the pH of the aqueous medium is maintained (a) in the range of from 3 to 5 when the $SiO_2$ to $Al_2O_3$ molar ratio in the crystalline aluminosilicate is in the range from 2 to 3,

TABLE X.—PREPARATION OF ZEOLITE LS 102

| | Reaction mixture—Oxide mole ratios of components | | | | Reaction conditions | | Zeolite product | |
|---|---|---|---|---|---|---|---|---|
| Run No. | $SiO_2/Al_2O_3$ | $Na_2O+K_2O/SiO_2$ | $H_2O/Na_2O+K_2O$ | $Na_2O/Na_2O+K_2O$ | Reaction stirred | Duration at 90°–100° C., hours | Composition | X-ray diffraction pattern |
| 51 | 20 | 0.35 | 40 | 0.67 | Yes | 20 | $0.35Na_2O:0.58K_2O:Al_2O_3:6.5SiO_2:8.3H_2O$ | Zeolite LS 102. |
| 52 | 20 | 0.35 | 40 | 0.67 | No | 40 | Not determined | Zeolite LS 102 plus trace (less than about 2%) K/Na phillipsite. |
| 53 | 20 | 0.30 | 45 | 0.22 | Yes | 180 | ...do... | Zeolite LS 102 plus some (about 5%) K/Na phillipsite. |

I claim:

1. A process for the preparation of a crystalline synthetic zeolite which comprises the steps of (a) treating a crystalline zeolite having the formula

$$xM_2O/n:Al_2O_3:ySiO_2:zH_2O$$

wherein M is elected from the group consisting of a metal cation, an ammonium cation, or a hydrogen cation, $n$ is the valency of the cation, $x$ has a value lying in the range of from 0.7 to 1.3, $y$ has a value lying within the range of from 2 to 15 and $z$ has a value of up to 10, with acid to remove aluminum (b) in the range of from 2 to 4 when the $SiO_2$ to $Al_2O_3$ molar ratio in the crystalline aluminosilicate is in the range of from 3 to 5, (c) in the range of from 1 to 4 when the $SiO_2$ to $Al_2O_3$ molar ratio in the crystalline aluminosilicate is in the range of from 5 to 6 (d) in the range of from 0 to 4 when the $SiO_2$ to $Al_2O_3$ molar ratio in the crystalline aluminosilicate is in the range of from 6 to 9 and (e) in the range of from −1 to 3 when the $SiO_2$ to $Al_2O_3$ molar ratio in the crystalline aluminosilicate is in the range of from 9 to 15.

12. A process in accordance with claim 1 wherein the siliceous component, the alumina component, the alkali metal component and water are present in the reaction mixture in the oxide mole ratios.

| | |
|---|---|
| $SiO_2/Al_2O_3$ | 2.0–40.0 |
| $Na_2O+K_2O/SiO_2$ | 0.35–2.0 |
| $H_2O/Na_2O+K_2O$ | 10.0–140.0 |
| $Na_2O/Na_2O+K_2O$ | 0–1.0 | with the proviso that where the ratio of $Na_2O/Na_2O+K_2O$ is 1, then the $SiO_2/Al_2O_3$ ratio is less than 8.

13. A process in accordance with claim 1 wherein the siliceous component, the alumina component, the alkali metal component and water are present in the reaction mixture in the oxide mole ratios

| | |
|---|---|
| $SiO_2/Al_2O_3$ | 15–30 |
| $Na_2O+K_2O/SiO_2$ | 0.3–0.35 |
| $H_2O/Na_2O+K_2O$ | 20–100 |
| $Na_2O/Na_2O+K_2O$ | 0.1–0.9 |

References Cited

UNITED STATES PATENTS

| | | | |
|---|---|---|---|
| 3,094,383 | 6/1963 | Dzierzanowski et al. | 23—112 |
| 2,950,952 | 8/1960 | Breck et al. | 23—113 |
| 3,506,400 | 4/1970 | Eberly et al. | 23—111 X |
| 3,551,353 | 12/1970 | Chen et al. | 252—455 |
| 3,390,958 | 7/1968 | Howell | 23—112 |

FOREIGN PATENTS

| | | | |
|---|---|---|---|
| 806,587 | 2/1969 | Canada | 23—112 |
| 1,061,847 | 3/1967 | Great Britain | 23—111 |

OTHER REFERENCES

Barber et al.: "Canadian Journal of Chemistry," vol. 42, 1964, pp. 1481–1487.

EDWARD J. MEROS, Primary Examiner